United States Patent
Vattelana et al.

[11] Patent Number: 6,082,333
[45] Date of Patent: Jul. 4, 2000

[54] ROTATION LIMITING CONNECTIONS BETWEEN CROSS-OVER TUBES AND FUEL RAILS FOR INTERNAL COMBUSTION ENGINES

[75] Inventors: Gary D. Vattelana, Prince George, Va.; Anthony Franchitto, West Hollywood, Calif.

[73] Assignee: Siemens Automotive Corporation, Auburn Hills, Mich.

[21] Appl. No.: 09/226,394

[22] Filed: Jan. 6, 1999

[51] Int. Cl.⁷ .................................................. F02M 37/04
[52] U.S. Cl. .................................... 123/456; 123/468
[58] Field of Search .................................. 123/468, 469, 123/470, 456

[56] References Cited

U.S. PATENT DOCUMENTS

| | | | |
|---|---|---|---|
| 5,002,030 | 3/1991 | Mahnke | 123/469 |
| 5,092,300 | 3/1992 | Imoehl et al. | 123/456 |
| 5,197,436 | 3/1993 | Ozawa | 123/468 |
| 5,390,638 | 2/1995 | Hornby et al. | 123/456 |
| 5,445,130 | 8/1995 | Brummer et al. | 123/456 |
| 5,511,527 | 4/1996 | Lorraine et al. | 123/456 |

Primary Examiner—Thomas N. Moulis

[57] ABSTRACT

A mechanical rotation limiting connection, defined between the end of a rigid metal cross-over tube and the adjacent end of a fuel rail, is disclosed. The coupling comprises a fitting that is inserted into, and permanently joined to, an open end of the fuel rail. The fitting includes a body complementary in shape to the fuel rail, with an enlarged flange at its trailing end, a tapered leading section, and an axial bore of stepped configuration. The leading section of the cylindrical cross-over tube is deformed into a polygonal shape that fits into the bore of the fitting; a transition section and a round section extend inboard of the leading section, and an enlarged annular collar encircles the cross-over tube. The leading section of the cross-over tube is inserted into the fitting, and mechanical members on the fitting are deformed or crimped over the annular collar on the cross-over tube to lock the tube within the fitting, and prevent inadvertent disassembly. Clearance between the leading end of cross-over tube and the axial bore in the fitting permits limited rotational movement. The extent of the removement is limited by flats in the bore of the fitting, by the movement of an orientation bead within the cut-out segment of a trailing flange, or other mechanical constraints. An O-ring seated about the round section of the tube fits in the stepped bore of the fitting to prevent leakage.

14 Claims, 10 Drawing Sheets

6,082,333

ROTATION LIMITING CONNECTIONS BETWEEN CROSS-OVER TUBES AND FUEL RAILS FOR INTERNAL COMBUSTION ENGINES

FIELD OF THE INVENTION

The instant invention relates broadly to connections between cross-over tubes and fuel rails that supply fuel to fuel injectors for an internal combustion engine. More particularly, the invention relates to diverse connections that are configured to allow limited rotation between the cross-over tubes and the fuel rails during assembly, and to the methods of forming and assembling such couplings.

BACKGROUND OF THE INVENTION

Fuel injected internal combustion engines have gained widespread acceptance as a fuel efficient alternative to conventional, carbureted engines. Fuel injected internal combustion engines are now electronically controlled by an on-board electronic control unit (ECU).

Fuel is supplied to the injectors (one for each cylinder in the engine) by plastic, or metal, fuel tubes, of round, square, or rectangular shape, commonly known as fuel rails. The fuel rails are adapted to receive the injectors, at spaced internals, to align same with the inlet port for each cylinder. The individual injectors may be retained on the fuel rail by clips, or other mechanical members. The fuel rails, with the depending injectors, are mated with the engine block, during the assembly process.

The mating of the fuel rail/injector subassembly, with the intake valves for the cylinders within the engine block, is relatively straightforward. However, when dealing with V-configured engines, such as V-6 or V-8 cylinder banks, greater difficulty is encountered. Angular adjustments, or corrections, made during assembling the fuel rail/injector subassembly to the engine block, are reflected in angular mismatching between the fuel rails and the rigid cross-over tube(s) joining same together. The mismatching is complicated by the production requirements of the assembly line, and by the cramped space available to work within, or under, the hood of the automobile.

The opposite ends of fuel rails are joined to rigid cross-over tubes associated with the supply, and return, sides, of the fuel system of the automotive vehicle. A representative fuel assembly (12) is shown in FIG. 1 of U.S. Pat. No. 5,002,030, granted Mar. 26, 1991, to Randall M. Mahnke, and assigned to the assignee of the instant application. The assembly (12) includes fuel rails (14, 16), cross-over tubes (28, 36), and pressure regulator (38); the flow path of the fuel is indicated by directional arrows (42, 44).

Quick, easily assembled, and reliable, connections must be established between the cross-over tubes and the fuel rails. Such connections must also be able to permit the cross-over tube to rotate relative to the longitudinal center-line of the fuel rail to compensate for any angular mismatch introduced during prior steps in the assembly process.

A known coupling (46) that addresses these problems is shown in FIG. 4 of U.S. Pat. No. 5,002,030. Such coupling functions in concert with annular flange (52) that is spaced inwardly of the terminal end (28a) of the cross-over tube (28); the end of the cross-over tube is inserted into an axial recess (48) in the fitting (46) retained in the end of the fuel rail (16). An O-ring (58) situated between the fitting and the annular flange seals the connection. The coupling (46) comprises a retainer (54) with an arcuately shaped flange (56) that provides a saddle support for the cross-over tube, and a bolt (55) connects the retainer to the end of the fuel rail. The bolt prevents axial separation of the components, but the cross-over tube may rotate freely relative to the fuel rail.

Another known coupling (46') is shown in FIG. 5 of U.S. Pat. No. 5,002,030. Such coupling includes a stepped fitting (60') that is inserted into the end of the fuel rail (16'); a stop (62') is formed at the inner end of the fitting, and a recessed surface (64') is formed near the entrance to the fitting. An annular flange (52') is formed on the cross-over tube. The terminal end (28a') of the cross-over tube (28') is inserted into the fitting, so that the inner end of the tube abuts the stop (62'). O-ring (65') fits into the recessed surface and cooperates with the annular flange to seal the coupling. A retaining flange (66'), at the entrance into the fitting, contacts the annular flange, and retains the components in cooperating relationship. Slight axial play is permitted between cross-over tube (28) and the fuel rail (16) is attainable, so that the O-ring seal (65') is not pinched. Consequently, the cross-over tube may be secured in the fitting, by crimping over flanges (67'); the cross-over tube may be rotated relative to the fuel rail, as noted in column 5, lines 10–41.

Whereas the couplings disclosed in U.S. Pat. No. 5,002,030, proved to be satisfactory in correcting for angular mismatches, such couplings require, and/or permit, a considerable degree of rotation between the cross-over tube and the fuel rail. The couplings utilize an annular flange on the cross-over tube to rotate upon an annular surface on the fitting inserted into the open end of the fuel rail. In some instances, wherein the engine compartment has reduced overhead, the degree of rotational movement of the cross-over tube must be reduced or curtailed, to suit the customer's demands, and existing couplings proved unable to meet the new operational criteria.

The known couplings required the assembly of several components, and each operation adds to the time and cost considerations relevant to high speed production, and assembly of automotive components. Simpler couplings are constantly sought for original equipment manufacture, as well as for the repair and/or replacement after-market.

Consequently, couplings with rotation limiting characteristics, which would permit rotational movement within prescribed limits, were sought. The limited extent of rotational movement would allow quick, accurate, and reliable couplings, even within sorely limited overhead space.

SUMMARY OF THE INVENTION

The instant invention contemplates a mechanical coupling, defined between the end of a rigid cross-over tube and a fitting inserted into a fuel rail, that is capable of limiting the rotational movement of the cross-over tube relative to the longitudinal center-line of the fuel rail. The rotational movement is sufficient to compensate for any mis-match between the fuel rail (and the fuel injectors operatively associated therewith) and the fuel injector cavities (usually located in the "head" of the engine). However, the extent of the rotation is limited to a specific angular range, so that the coupling can be installed, by a worker on an assembly line, in the relatively tight overhead space allotted by current automobile designs.

The coupling may assume many forms, and shapes, but the common components for the four embodiments of mechanical coupling include (1) a rigid cross-over tube that has been (2) shaped or configured at its leading section to be inserted into a (3) fitting inserted into the open end of (4) an adjacent fuel rail. An annular collar (5) is defined on the cross-over tube, and (6) an O-ring fits over the cross-over tube and seats within the interior of the fitting to form a seal between the fitting and the cross-over tube.

The fitting comprises a cylindrical body with a tapered leading edge and an enlarged flange that rests against the edge of the fuel rail and maintains the fitting in fixed axial position. The fitting is brazed into permanent engagement with the fuel rail. Ears or tabs at one end of the fitting may be crimped, or otherwise deformed, to lock the cross-over tube within the fitting.

A bore extends axially throughout the body of the fitting. In contrast to the cylindrical bores in known couplings, the bore may assume different polygonal shapes. In one embodiment, for example, the bore is elliptical in shape, and receives a somewhat smaller, similarly shaped leading edge of the cross-over tube; one or more flats interrupt the elliptical shape of the bore. In another embodiment, the bore is defined, internally, by a series of alternating flat and arcuate sections that receive, and cooperate with, the leading end of the cross-over tube. The leading end of the cross-over tube has been formed into a polygonal shape, such as a rectangle, to be received within the bore of the fitting. The cross-over tube may also include an annular transition section inboard of the leading section, a round section located intermediate the transition section and an enlarged annular collar. The round section provides a concentric sealing surface for this O-ring.

The instant invention further contemplates unique methods of forming, and assembling, the components for the coupling, including the step of forming at least one, and perhaps, as many as four, flattened sides on the leading end, edge or section, of the cross-over tube; and forming the axial, internal bore in the fitting, in a complementary manner. The cooperating surfaces on the cross-over tube and the interior of the bore of the fitting determine the extent of penetration of the cross-over tube into the fitting, while the clearance therebetween permits limited rotational movement. The deformed leading end of the cross-over tube represents the only area of contact between the cross-over tube and the fuel rail fitting, and thus the only relationship for limiting rotation. The limited rotational movement compensates for angular mismatch, within the reduced space above the engine block.

In lieu of forming at least one flattened side at the leading end, or section, of the cross-over tube, all four sides may be flattened, or deformed, to define a rectangular section. A transition section is formed inboard of the leading section, and a rounded section, is located inboard of the transition section. The rounded section corresponds to the nominal dimension of the cross-over tube. An enlarged annular collar is formed inboard of the round section. Ears or tabs are formed at one end of the fitting. Consequently, after the leading edge of the cross-over tube is inserted into the fitting, to the desired depth or degree of penetration, the tabs on the fitting are crimped over the annular collar to secure the cross-over tube to the fitting and prevent removal therefrom.

While the preferred embodiment of the instant coupling utilizes a cross-over tube with a leading end of rectangular cross-section to cooperate with a fitting with an axial bore of complementary shape, the leading end may have only one flattened surface, with the remainder of the cylindrical tube retaining its arcuate shape. Alternatively, the leading end of the cross-over tube may be elliptical in shape, for cooperation with a fitting having an axial bore of complementary shape, interrupted by one or more flats. Other geometrical shapes may also be suitable for the leading end of the cross-over tube, and the complementary shape of the axial bore in the cross-over fitting.

In another novel method for forming, and assembling, the coupling, an orientation bead is formed, or brazed, onto the cross-over tube adjacent to the annular collar; the bead fits into a cut-out on the annular flange of the cross-over fitting. The extent of rotation of the coupling is thereby positively limited.

The cross-over tube and the associated fitting are sturdy metal parts that contribute to an extended service life; the fitting is permanently joined to the tube rail, as by brazing. The cross-over tube is secured to the fitting by crimping ears at the upper end of the body of the fitting into locking engagement with the annular collar on the cross-over tube. An O-ring situated between the cross-over tube and the stepped inner bore of the fitting provides a leak-proof seal.

Yet other operational advantages attributable to the four embodiments of the instant, rotation limiting coupling, will occur to the skilled artisan, when the accompanying drawings are construed in harmony with the appended specification. The several embodiments achieve the desired rotational limiting function, ease of manufacture, and facile assembly, without resorting to uniquely shaped clips, retainers, and the other specialty hardware components, that add cost and complexity to known couplings used in similar circumstances.

DETAILED DESCRIPTION OF THE PREFERRED EMBODIMENT

Figure 1:
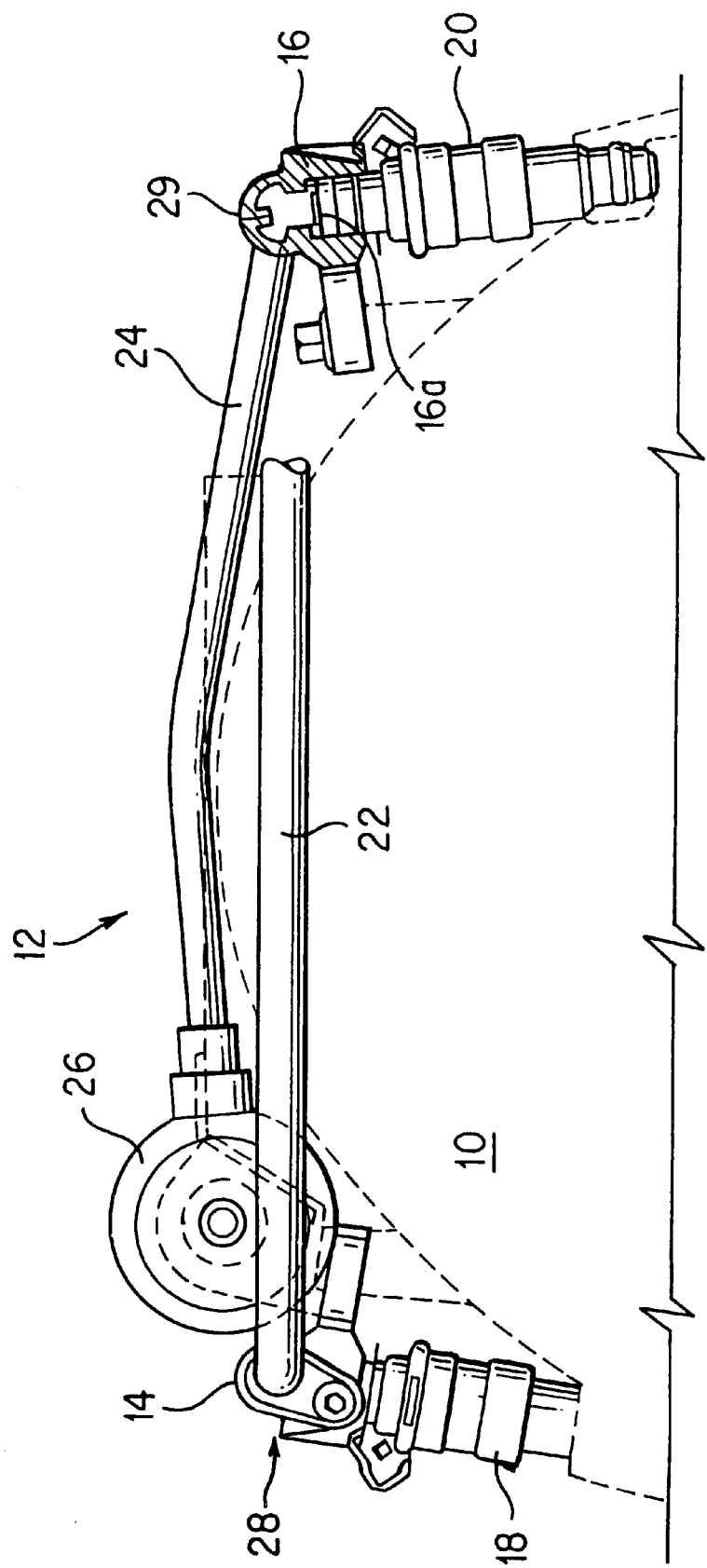
FIG. 1 is and an end elevational view of a conventional fuel rail assembly for an internal combustion engine, such assembly including a pair of spaced fuel rails, a pair of cross-over tubes, fuel injectors, and a pressure regulator.

FIG. 1 depicts an exemplary internal combustion engine which employs a fuel rail assembly 12. Assembly 12 includes a pair of rigid, elongated tubular fuel rails 14, 16 disposed in substantially parallel orientation relative to one another. Fuel rail 14 supplies fuel to the inlet ends of a series of injectors 18 located in the inlet ports of one bank of combustion chambers of engine 10. Fuel rail 16 supplies fuel to the inlet ends of a series of injectors 20 located in the inlet ports of the other bank of combustion chambers of engine 10.

A rigid, metal conduit, commonly known as a cross-over tube 22, joins fuel rails 14, 16 together. A second parallel cross-over tube 24, at the opposite face of the engine, joins that remote end of fuel rail 16 to fuel regulator 26, and thence to the to the return side of the fuel system for the vehicle (not shown). A more comprehensive discussion of fuel rail assembly 12, and the manner of operatively associating same with the inlet ports of the several combustion chambers of an internal combustion engine will be found in U.S. Pat. No. 5,002,030, granted to R. M. Mahnke.

Connection 28 is employed to join one end of cross-over tube 22 to fuel rail 14, and a second, similar connection 30 is employed to join the opposite end of cross-over tube to fuel rail 16. Only connection 28 is illustrated, in detail, in FIGS. 2 and 3, but connector 30 is of similar configuration.

Figure 2:
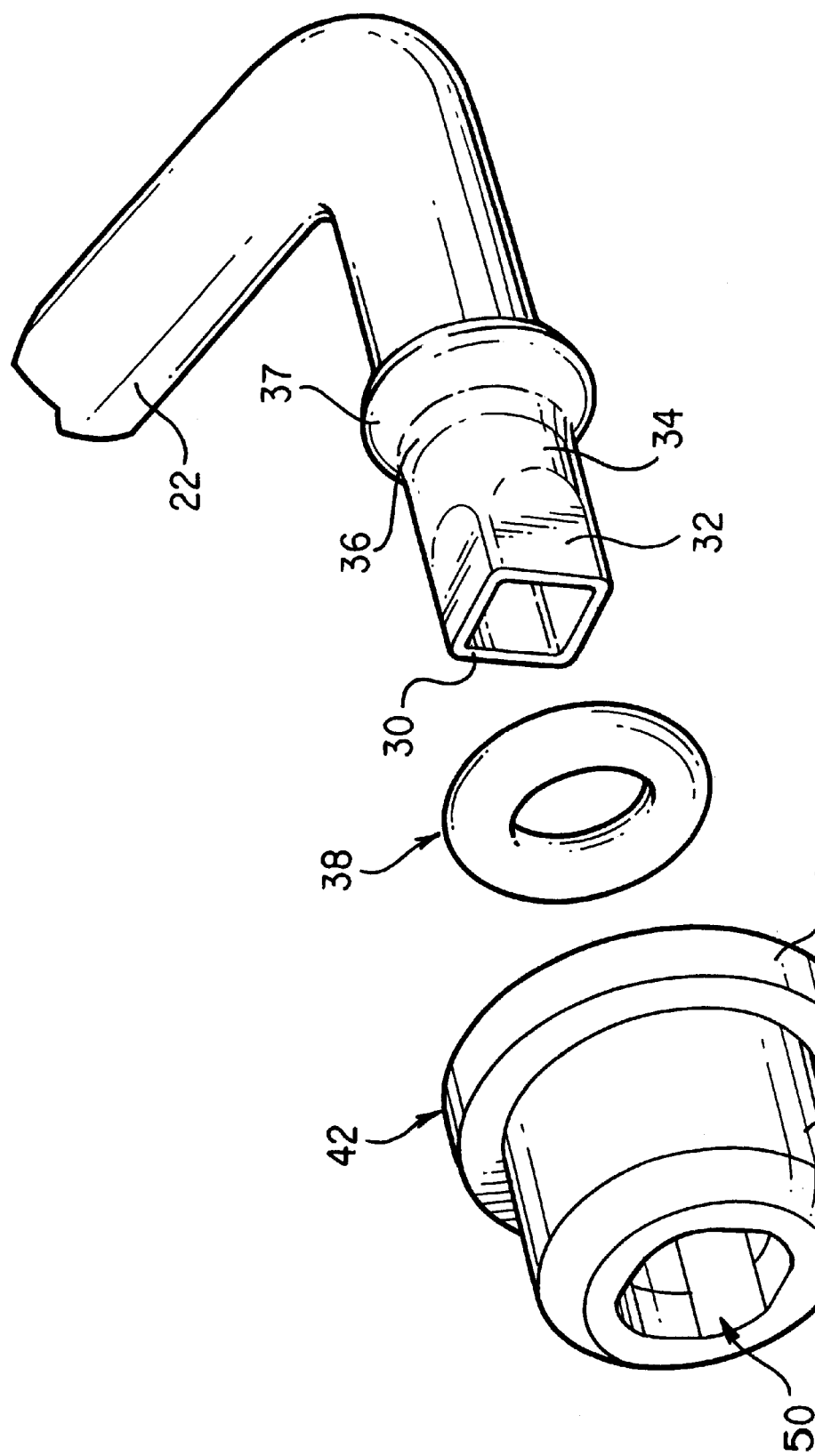
FIG. 2 is an exploded perspective view of the preferred embodiment of the instant coupling, comprising a cross-over fitting, and an O-ring, and a cross-over tube with a rectangular end.

End 30 of cross-over tube 22 is flattened, deformed, or otherwise shaped into a rectangular section 32. A transition section 34 is situated intermediate rectangular section 32 and round section 36. An annular collar 37 is located inboard, of section 36. Annular O-ring 38 fits over rectangular section 32, and collar 37 limits the movement of the O-ring along cross-over tube 22, as shown in FIG. 2.

Figure 3:
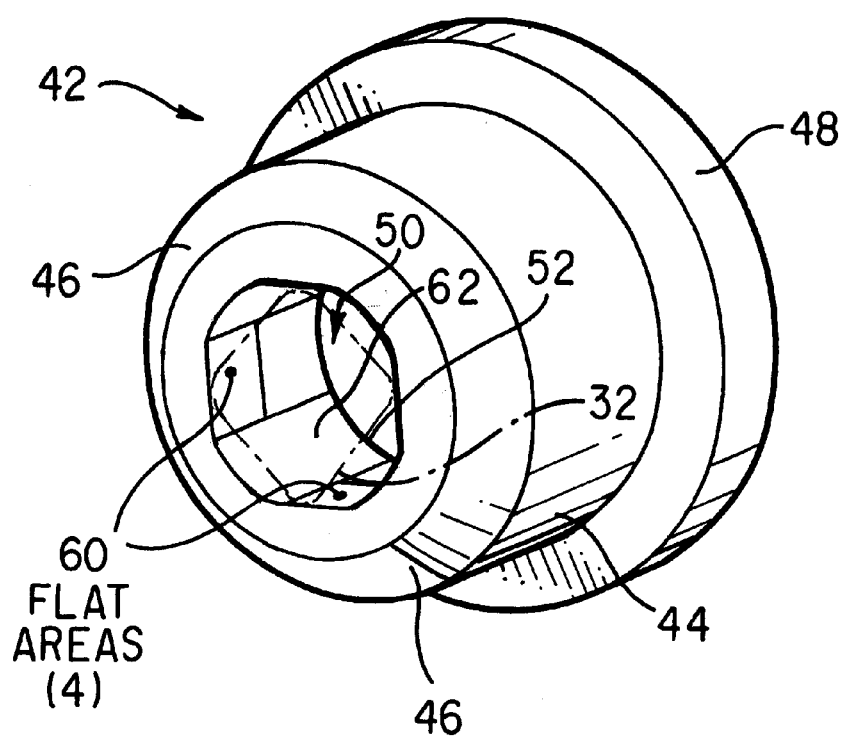
FIG. 3 is a perspective view, at a different angle, showing the flat and arcuate areas in the bore of the cross-over fitting.

A cross-over fitting, indicated generally by reference numeral 42 fits into the open end of fuel rail 14 adjacent over tube 22, as shown in FIG. 3. Fitting 42 comprises a cylindrical body 44 with a tapered leading end 46, also called a chamfer, and an enlarged annular flange 48 at its trailing end. Bore 50 extends axially through cross-over fitting 42.

Bore 50 is divided along its axial length into steps of different widths. The bore is narrowest at bottom step 52, widens slightly at intermediate step 54, gradually widens through tapered step 56, and reaches its maximum width at step 58. Alternating flats 60 and arcuate segments 62 extend around bottom step 52 in bore 50, as shown in FIG. 3. The size of rectangular end 32 of cross-over tube 22, relative to step 52 of bore 50 of fitting 42, is indicated by the dotted outline in FIG. 3.

Figure 4:
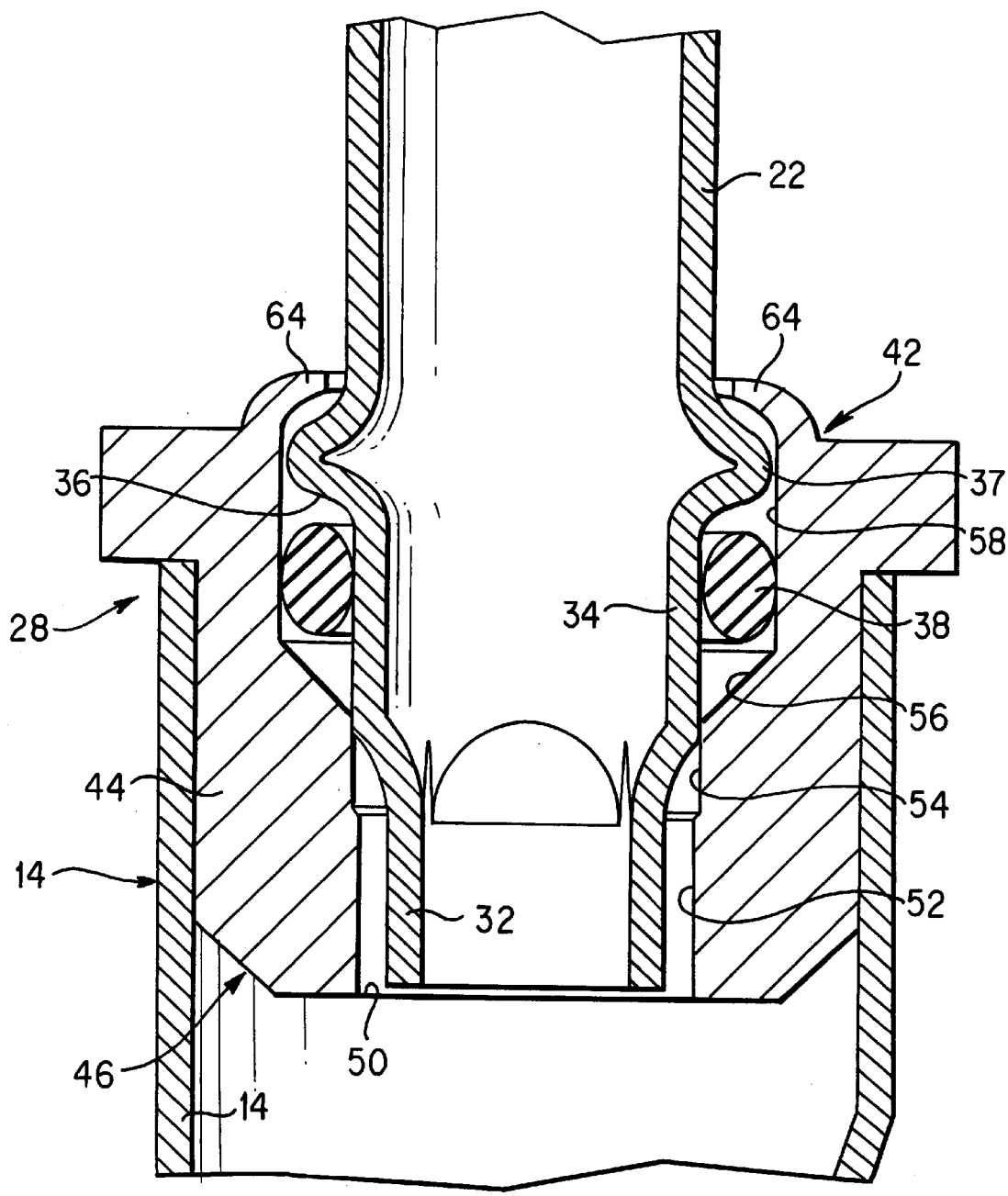
FIG. 4 is a cross-sectional view through the coupling shown in FIG. 2 after assembly, the fitting being seated within the open-end of the fuel rail.

Fitting 42 is inserted into the open end of fuel rail 14, so that flange 48 abuts the fuel rail and body 46 extends into the fuel rail. O-ring 38 is seated about transition section 34 of end 30 of cross-over tube 22, and is located within step 58 of bore 50, as shown in FIG. 4, to prevent leakage between fuel rail 14 and cross-over tube 22. Rectangular section 32 of cross-over tube 22 fits clearly within step 52 of bore 50, and adequate clearance is maintained on all sides. After cross-over tube 22 is properly seated in fitting 42, tabs 64, situated at the upper end of fitting 42, are deformed, crimped, or otherwise folded over annular collar 37 on cross-over tube 22 to lock the cross-over tube in fixed axial position.

DESCRIPTION OF ALTERNATIVE EMBODIMENTS

Figure 5:
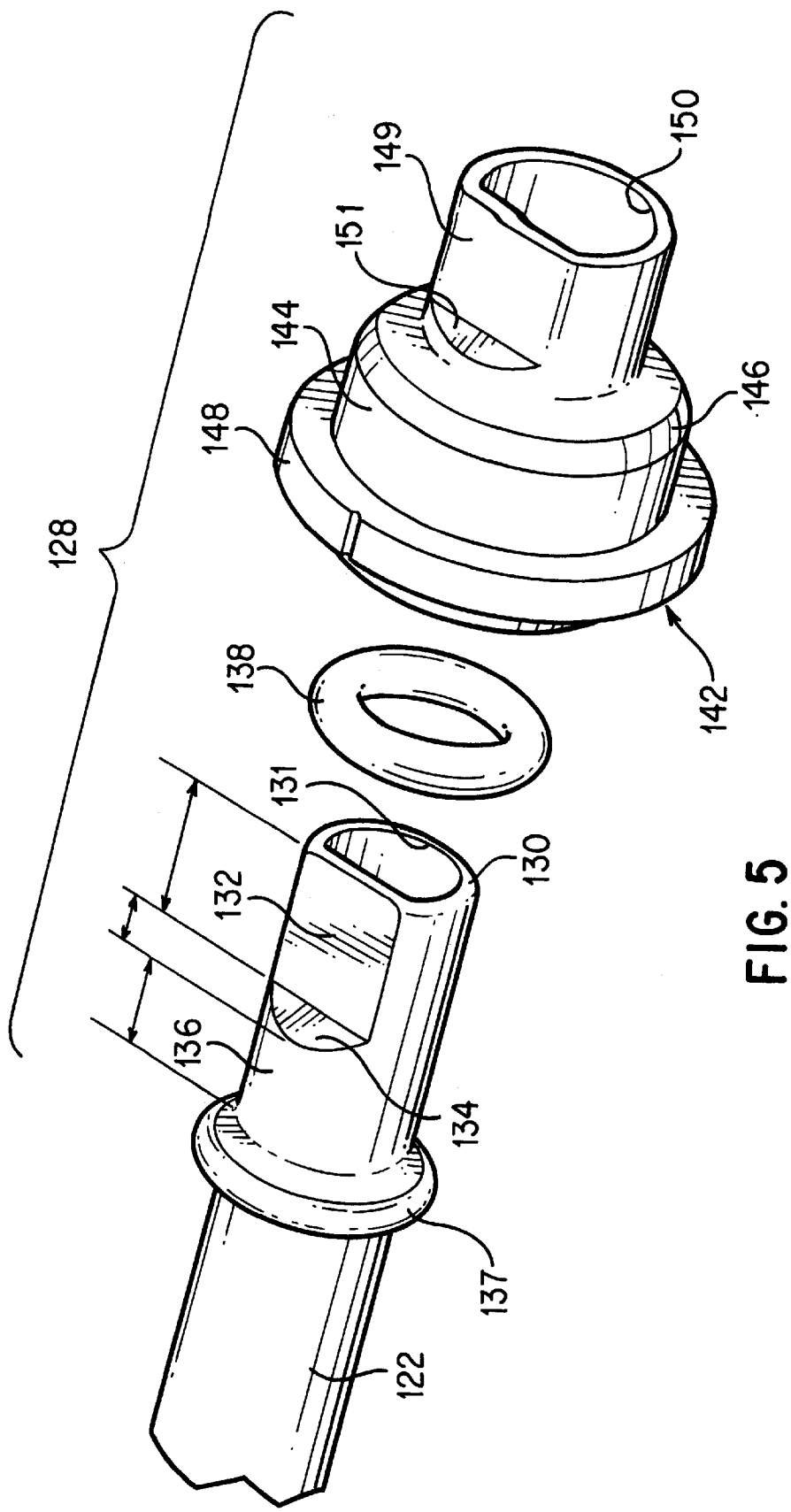
FIG. 5 is an exploded perspective view of a first alternate embodiment of the instant coupling.
Figure 6:
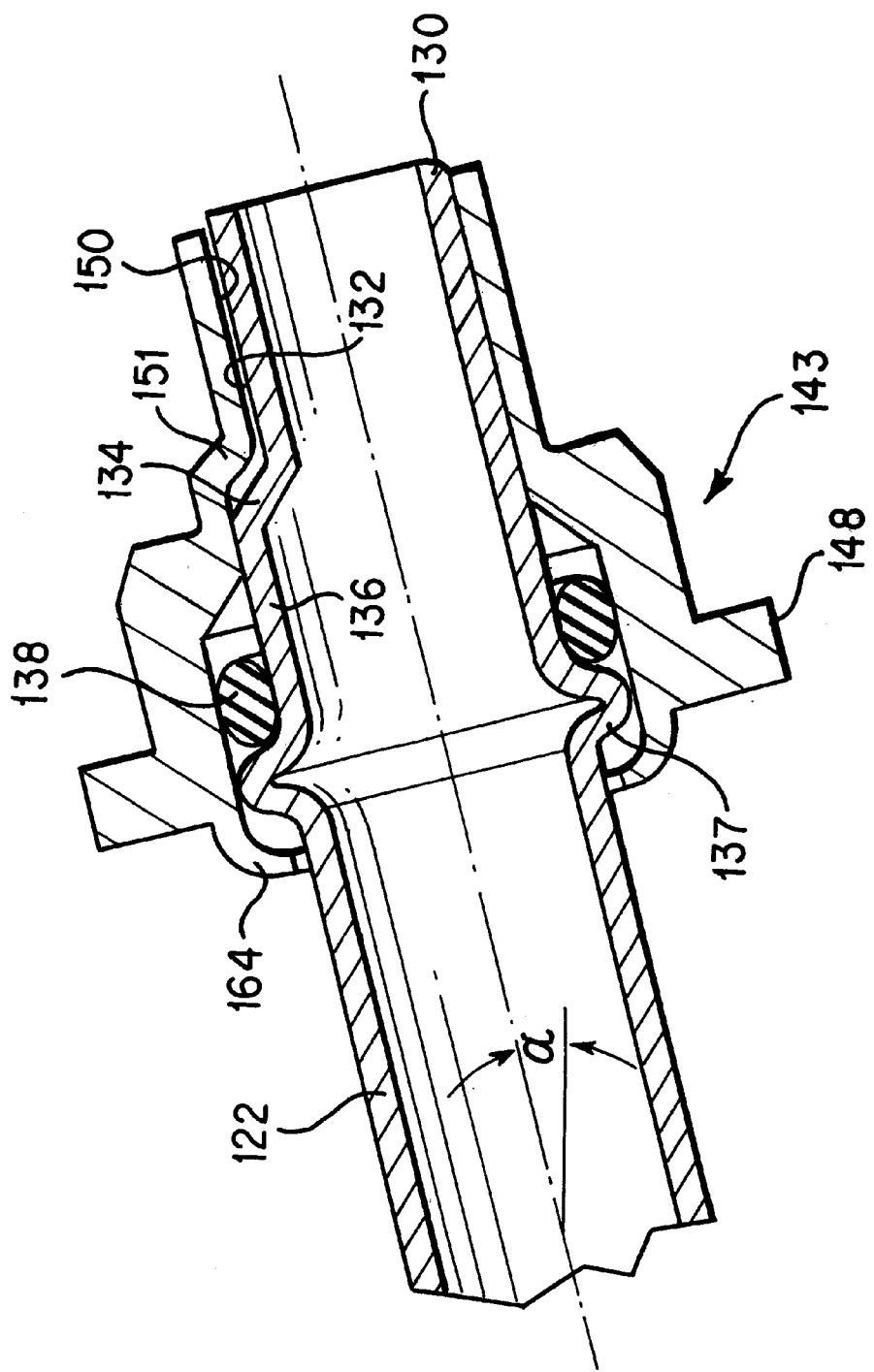
FIG. 6 is a cross-sectional view through the coupling shown in FIG. 5 after assembly.

A first alternative embodiment of the unique coupling for securing one end of a cross-over tube to one end of a fuel rail, while limiting relative rotation therebetween, is shown in FIGS. 5 and 6. Whereas the preferred embodiment of the coupling, shown in FIGS. 1–4, is identified generally by reference numeral 28, the first alternative embodiment, shown in FIGS. 5–6, is identified generally by reference numeral 128.

The leading section 130 of cross-over tube 122 is D-shaped, with a hollow bore 131 and a flattened surface 132. A transition section 134 is formed inboard of surface 132, and a rounded section 136 extends inwardly from transition section 134. An enlarged annular collar 137 is situated inboard of rounded section 136. The diameter of rounded section 136 is equal to the diameter of cross-over tube 122. An O-ring 138 is slipped over the leading section 130 of cross-over tube 122; the axial movement of O-ring 138 is limited by annular collar 137.

Cross-over fitting 142 comprises an integral body composed of several sections including a cylindrical body 144 with a tapered leading edge 146, an enlarged flange 148, and a D-shaped section 149. A bore 150, of stepped configuration, extends axially through fitting 142, and a stop 151 is situated between leading edge 146 and D-shaped section 149, as shown in FIG. 5. The step within bore 150 cooperates with complementary surfaces on cross-over tube 122 to limit the penetration of the tube, into the fitting, during assembly.

FIG. 6 shows the leading section of cross-over tube inserted axially into cross-over fitting 142 so that transition section 134 abuts against stop 151. O-ring 138 is retained in sealing position by collar 137, and the O-ring fits within the largest step in bore 150 of fitting 142. Tabs 164 at the upper end of fitting 142 are crimped over to retain collar 137 on cross-over tube 122 and prevent accidental disassembly. Flange 148 seats cross-over fitting 142 within the fitting in the open end of fuel rail 14 (not shown in FIG. 6).

Figure 7:
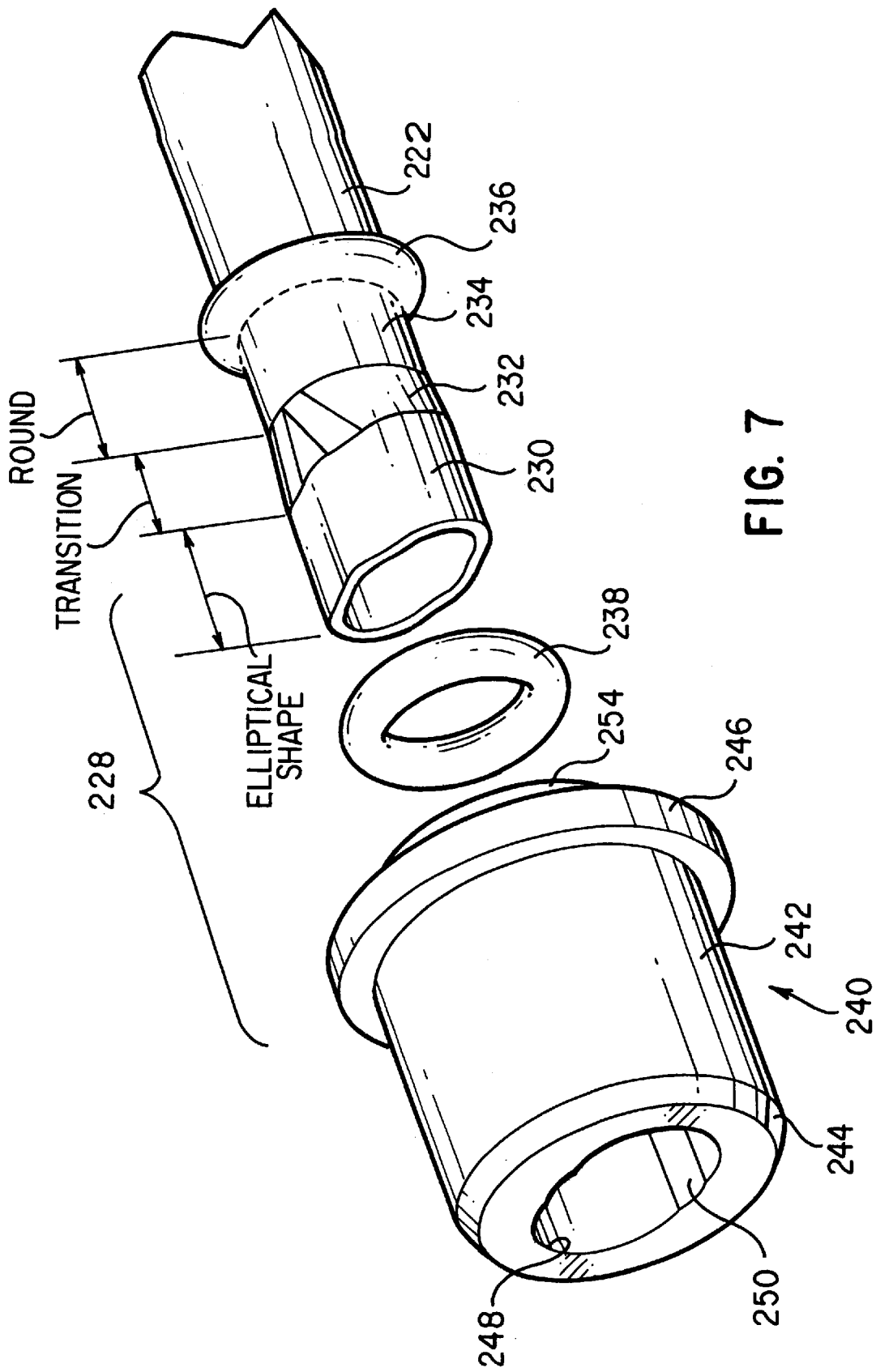
FIG. 7 is an exploded perspective view of a second alternative embodiment of the instant coupling.
Figure 8:
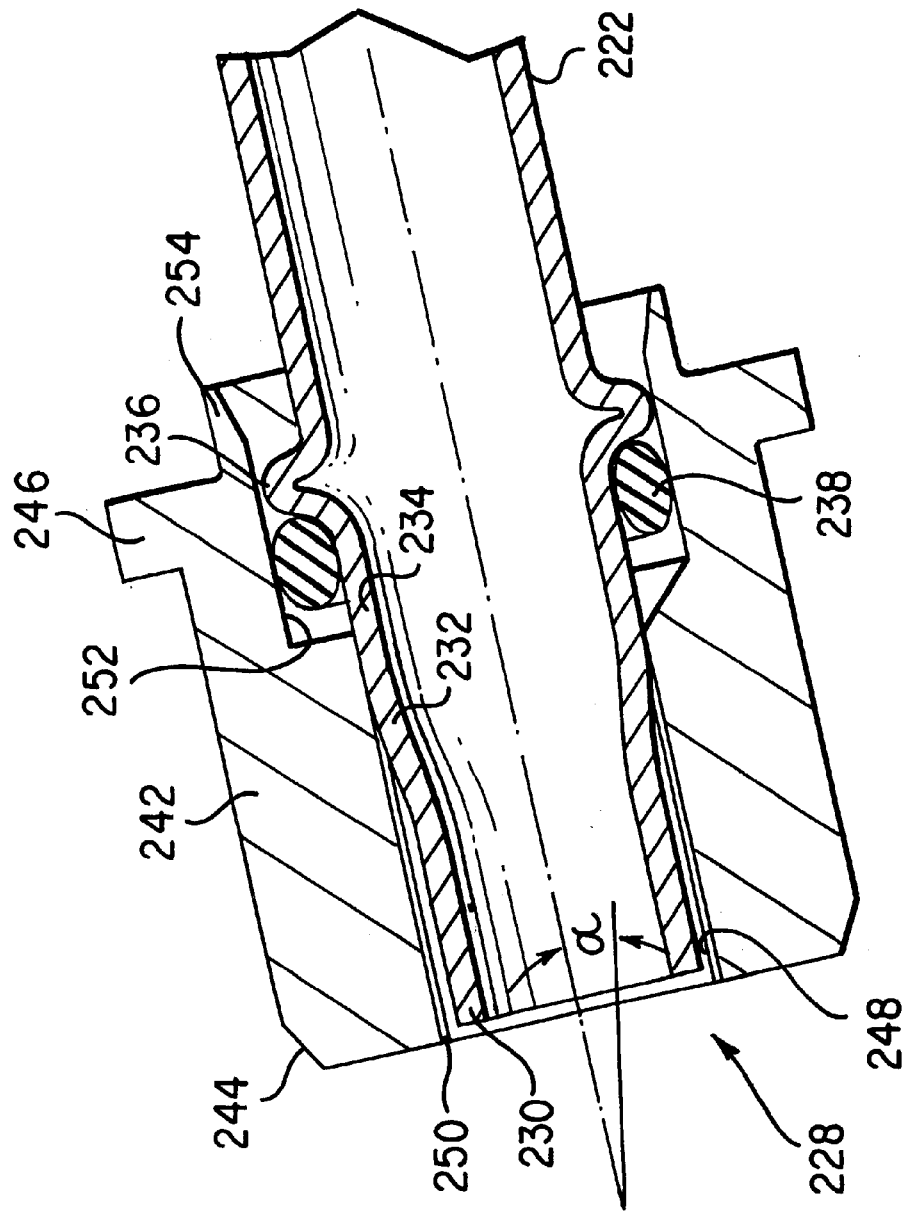
FIG. 8 is a cross-sectional view through the coupling shown in FIG. 7 after assembly.

A second alternative embodiment of the unique coupling for securing one end of a cross-over tube to a fuel rail, while limiting relative rotation therebetween, is shown in FIGS. 7 and 8. Whereas the preferred embodiment of the coupling is identified generally by reference numeral 28, and the first alternative embodiment is identified by reference numeral 128, the second alternative embodiment is identified by reference numeral 228.

The leading section 230 of cross-over tube 222 is elliptically shaped, and shown in FIG. 7, and a transition section 232 is formed inboard of leading section 230, and round section 234 is inboard of transition section 232. An enlarged annular collar 236 is formed adjacent round section 234. O-ring 238 is slipped over the leading section 230 of cross-over tube 222.

Cross-over fitting 240 comprises an integral body composed of several sections, including a cylindrical body 242 with a tapered leading edge 244, an enlarged flange 246, and an axial bore 248, and interrupts the otherwise elliptical bore. The bore extends axially through the fitting, and one or more flat sections 252 extend at least partway through bore 250. The bore is complementary in shape, and slightly larger than, the elliptical shape of leading section 230 by cross-over tube 222.

FIG. 8 shows the leading section 230 of cross-over tube 222 inserted axially into the bore 248 of cross-over fitting 240 so that collar 236 presses against O-ring 238, which is seated in an enlarged step 252 in bore 248. Ears 254, at the upper end of fitting 240, are crimped over collar 236, to prevent cross-over tube 222 from being withdrawn from fitting 240, and disassembling coupling 228. The clearance between leading section 230 on cross-over tube 222 and bore 248 of fitting 240 allows relative motion therebetween; the extent of movement is limited by the rounded surfaces of leading section 230 contacting flat section 250 within bore 248.

Figure 9:
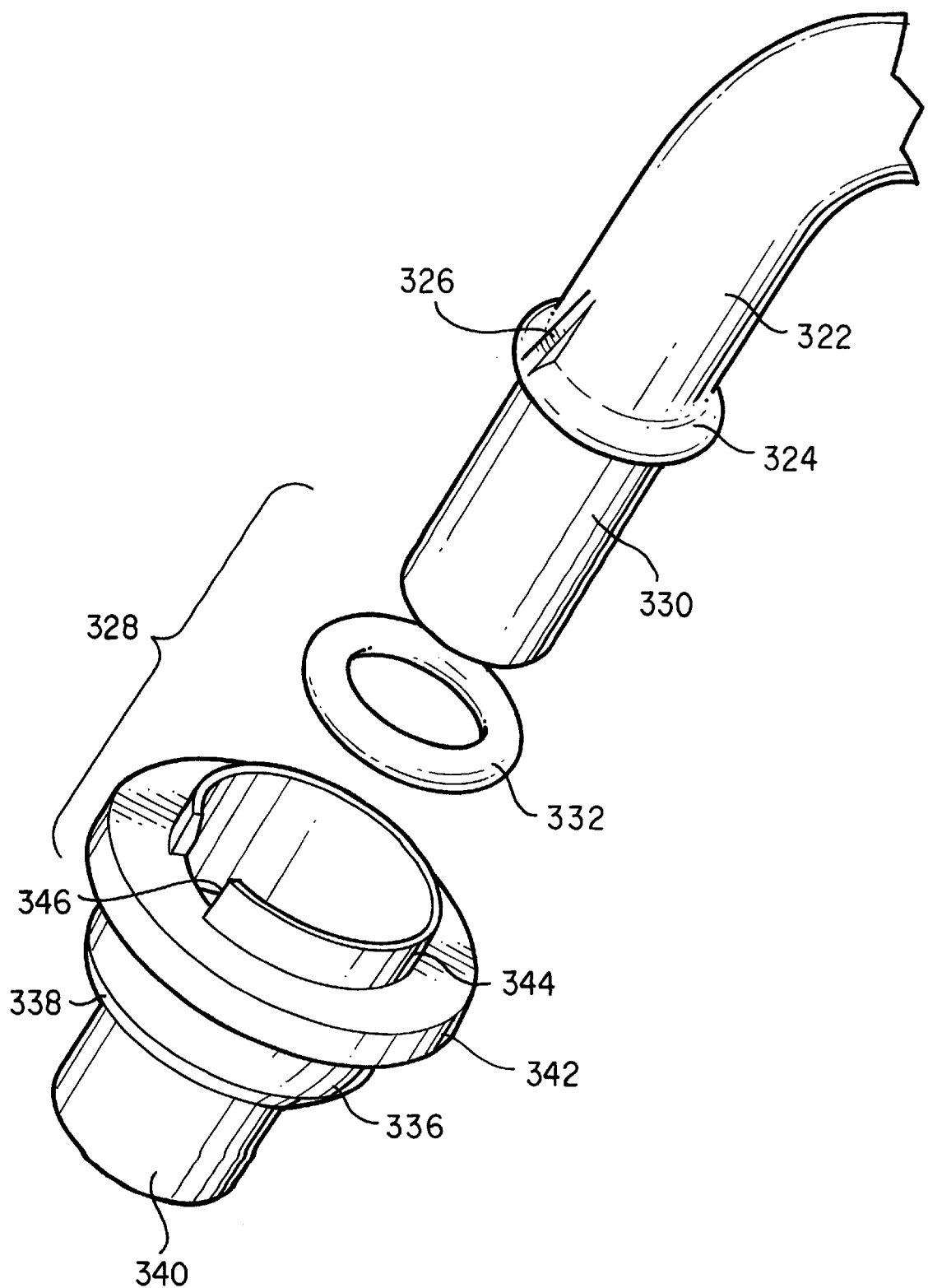
FIG. 9 is an exploded perspective view of a third alternative embodiment of the instant coupling.
Figure 10:
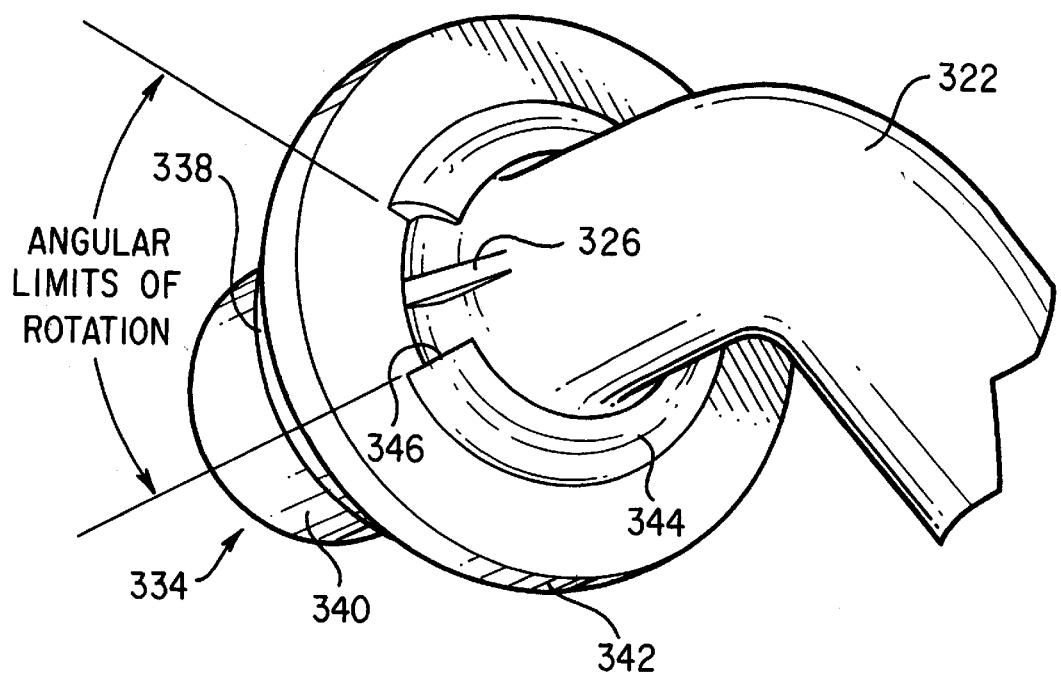
FIG. 10 is a perspective view of the cross-over tube and cross-over fitting of the coupling of FIG. 9, but showing the tube and fitting after assembly.

A third alternative embodiment of the unique coupling is shown in FIGS. 9 and 10. Whereas the preferred embodiment of the coupling is identified generally by reference numeral 28, the first alternative embodiment is identified generally by reference numeral 128, and the second alternative is identified generally by reference numeral 228. The third alternative embodiment is identified generally by reference numeral 328.

The leading section 330 of cross-over tube 322 is cylindrical in shape; and an enlarged annular collar 324 is situated inboard of the leading section. An orientation bead 326 is welded or otherwise joined to collar 324, and extends axially inward from collar 324. And an O-ring 332 slips over leading section 330 of cross-over tube 322, but collar 324 limits its axial movement.

Cross-over fitting 334 comprises a cylindrical body 336 with a tapered leading edge 338, and an axially projecting nose 340, and an enlarged annular flange 342. A trailing ring 344 is located at the upper end of the fitting, and an arcuate segment 346 is removed from ring 344. As shown in FIG. 10, the extent of relative rotation between cross-over tube 322 and fitting 334 is defined by the movement of orientation bead 326 within the arcuate segment 346 of ring 344. Ring 344, as shown in FIG. 10, is crimped over collar 324, to complete the coupling 338, and to prevent cross-over tube 322 from inadvertently being removed from fitting 334.

Other refinements, modifications, and alterations, will occur to the skilled artisan from a consideration of the four embodiments discussed above. While the connections have been described with respect to cross-over tubes joined to fuel rails, the connections have other applications; for example, the connections may be used for in-line, single tube applications, or could be used to prevent inlet or outlet (supply or return) tubes, for a fuel distribution system, from rotating prior to assembly, thereby preventing problems after assembly. Consequently, the appended claims should be broadly construed in a manner consistent with the significant advances in the useful arts and sciences, and should not be limited to their literal terminology.

We claim:

1. A connection for securing a cross-over tube to a fuel rail in an automotive fuel distribution system,
    said connection comprising (a) a fitting adapted to be installed in one end of a fuel rail and (b) a cross-over tube secured within said fitting,
        said fitting comprising a body with an enlarged flange at one end, a leading edge, and an axial bore extending from said leading edge through said flange,
        said cross-over tube having a leading section deformed into a polygonal shape, a transition section, and an enlarged collar located inboard of said round section,
        said axial bore being greater in size than said leading section of said cross-over tube and being configured in a complementary manner,
        said cross-over tube being inserted into said fitting until said leading section of said cross-over tube extends to the end of said fitting with clearance therebetween, and
        mechanical members on said fitting being deformed over said enlarged annular collar on said cross-over tube to lock said cross-over tube within said fitting and prevent inadvertent withdrawal.

2. The connection as defined in claim 1, wherein axially extending flats are formed in said bore of said fitting, said flats cooperating with the polygonal shape of said leading section of said cross-over tube to limit the extent of relative rotational movement therebetween.

3. The connection as defined in claim 2, wherein the step formed at the entrance to said bore in said fitting contains alternating flat and arcuate segments.

4. The connection as defined in claim 1, wherein said axial bore in said fitting is formed with a series of steps of different cross-sectional areas.

5. The connection as defined in claim 4, wherein said step at the leading edge of said fitting is smallest in cross-sectional area, and the step adjacent to said enlarged collar is greatest in cross-sectional area.

6. The connection as defined in claim 1, wherein an orientation bead extends axially along said cross-over tube inboard of said enlarged collar, and cooperating means are defined at one end of said fitting.

7. The connection as defined in claim 1, wherein said mechanical members are metal ears that are crimped into locking position.

8. The connection as defined in claim 1, wherein said fuel rail, said fitting, and said cross-over tube are formed metal components.

9. The connection as defined in claim 1, wherein an O-ring encircles said round section of said cross-over tube and is seated within the stepped bore of said fitting to prevent leakage.

10. The connection as defined in claim 1, wherein said leading section of said cross-over tube is rectangular in shape.

11. The connection as defined in claim 1, wherein said leading section of said cross-over tube is elliptical in shape.

12. A method of forming a connection for securing a cylindrical, metal cross-over tube to a fuel rail in an automotive fuel distribution system, said method comprising the steps of:
    a) deforming the leading section of said cross-over tube into a different polygonal shape,
    b) forming a transition section on said cross-over tube inboard of said leading section, said transition section gradually blending into a round section at its inboard limit,
    c) forming an enlarged collar inboard of said round section,
    d) forming a metal fitting with an axial bore containing steps of different cross-sectional areas that are complementary to the configuration of said cross-over tube, said fitting having a leading end and an enlarged flange at its trailing end, inserting said fitting into the open end of a fuel rail until said flange contacts said rail,
    e) securing said fitting within said fuel rail,
    f) seating an O-ring within one of said steps within said axial bore of said fitting,
    g) inserting the leading section of said cross-over tube into said axial bore of said fitting until said enlarged collar rests within a step within said axial bore of said fitting, said cross-over tube being smaller in cross-sectional area than said axial bore in said fitting to provide clearance therebetween,
    h) forming axial extending flats, at the leading end of said axial bore within said fitting, said flats and said deformed leading end of said cross-over tube contacting each other to limit the rotational movement between said cross-over tube and said fitting in said fuel rail.

13. The method of forming a connection as defined in claim 12 further including the steps of (i) forming tabs at the trailing end of said fitting, and (j) mechanically deforming said tabs over said collar to lock said cross-over tube within said fitting and prevent inadvertent withdrawal.

14. The method of forming a connection as defined in claim 13 further including the step of (k) forming a transition section inboard of said deformed leading section of said cross-over tube.

* * * * *